E. Piper,
Refrigerator:
No. 36,107. Patented Aug. 5, 1862.
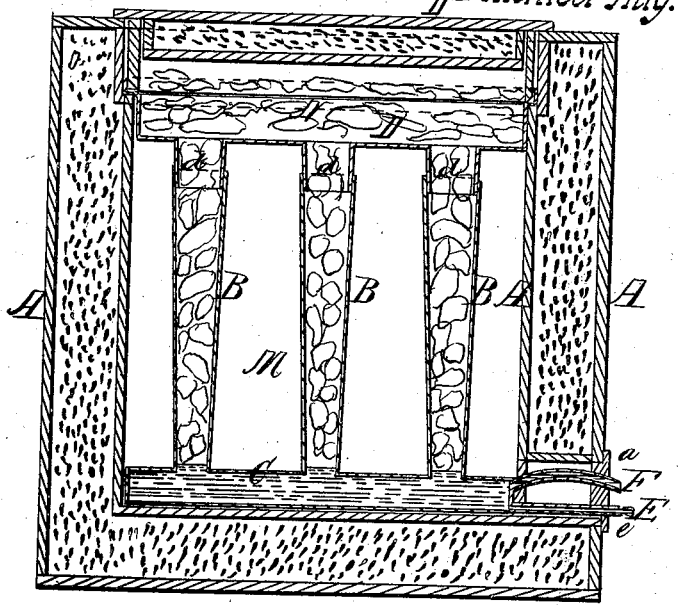
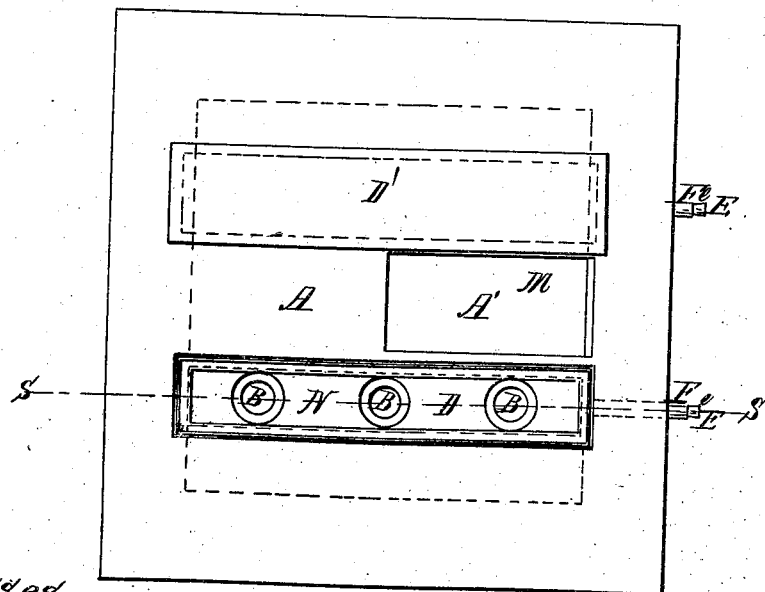
Witnesses,
Thomas D. Stilson
G. H. Botsick
Inventor,
Enoch Piper

UNITED STATES PATENT OFFICE.

ENOCH PIPER, OF CAMDEN, MAINE.

IMPROVEMENT IN APPARATUS FOR PRESERVING ANIMAL AND VEGETABLE SUBSTANCES.

Specification forming part of Letters Patent No. 36,107, dated August 5, 1865.

*To all whom it may concern:*

Be it known that I, ENOCH PIPER, of Camden, in the county of Knox and State of Maine, have invented a certain new and Improved Apparatus for Preserving Animal and Vegetable Matter by Means of Artificial Congelation; and I do hereby declare that the following is a full and exact description thereof, reference being had to the accompanying drawings, making part of this specification.

My present invention is an improved apparatus for the better carrying out of the method of preserving fish and other articles, for which Letters Patent were granted to me bearing date the 19th day of March, 1861; and it consists in a certain construction and arrangement of the vessels for the reception of the freezing-mixture and the parts connected therewith by which the charging and cleansing of the same are much facilitated and simplified, the effect of the apparatus rendered more lasting and more uniform, and the use of the freezing material economized.

To enable others skilled in the art to make and use my invention, I will proceed to describe its construction and operation by the aid of the drawings, in which—

Figure 1 is a section in the vertical plane indicated by the lines *s s* in Fig. 2, and Fig. 2 is a plan with one of the receivers for the cooling-mixture open.

Similar letters of reference indicate like parts in both the figures.

A A are the walls of the chamber M, made double and filled in with charcoal or other non-conducting substance, as usual. The opening for entering this chamber may be in any convenient position relatively thereto; but I prefer it at the top, as represented by A'.

B B B are tubes passing through the chamber M for the containing of the freezing-mixture N, as described in my patent before referred to. These tubes are tapering, or larger at the top than at the bottom, and are placed in rows across the chamber at proper intervals. The lower ends of those in each row are connected to a horizontal tube, C, extending across the bottom of the chamber. The upper ends of these tubes B are connected to troughs or pans D, which are supported upon the sides and are of sufficient length to embrace an entire row of tubes, as shown in the drawings. These troughs or pans D are provided with double covers D', filled with charcoal or other proper substance, as represented. Their connections with the several tubes B are formed by the aid of short sockets *d* on D and extending downward into B, so as to form a suitable connection and to allow the ready removal of D when desired.

The several tubes C are closed at both ends. At one end of each two pipes, E and F, are attached, the pipe E connecting with the extreme bottom of the tube and the pipe F at or near the top thereof. These pipes E and F extend out through the side A, as represented, and are for draining and cleaning the tube C. When the apparatus is in use, the tube E is stopped tightly with a plug, *e*. The tube F is allowed always to remain open. F extends upward above the upper side of the tube C, and, as the brine in C cannot flow out until it has attained a level equal to the highest part of F, it follows that the tubes C and lower ends of the tubes B are maintained full of brine, and none of the external warm air is allowed to enter through F and circulate through the interstices in the freezing-mixture.

Apertures are made through the double wall A to allow the tubes E and F to pass freely, and the apertures are stopped by tight-fitting but readily-removable covers *a*, applied as represented, so as to stop the circulation of air. Each tube C may be made shorter than represented, so as to allow the moving of the same with its attachments inward or backward from the side *a* sufficiently to draw a part or the whole of E and F within the interior of this double casing A and allow the whole, by turning it slightly, to be lifted from the structure. By this arrangement the pans D and tubes B and C may readily be removed for a thorough cleaning or any other required purpose; but my invention rarely requires to be so overhauled for, reasons which will appear below.

I prefer to make the tubes B and C and pans D of what is known as "galvanized iron;" but they may be made of any proper and convenient material which is a good conductor of caloric.

The ultimate effect of the apparatus is similar to that described in my patent before referred to, except that it is obtained more uniformly, continuously, and economically. The articles to be preserved are placed in the chamber, either previously prepared by freezing or not, as circumstances may require. A freezing mixture of ice and salt is placed in the pans D and tubes B, which cools the air in the chamber to some degree below the freezing-point of water and keeps the articles placed therein in a congealed state, whereby they are preserved from decay.

The pan D, connecting a row of tubes B, facilitates the filling thereof by leading the freezing-mixture into the latter, and of itself serves to cool the air in the chambers so long as the store therein remains. The tapering of the tubes B allows the inclosed ice to be supported by the sides and to maintain a contact therewith by sinking lower in the tube, where it is smaller, as it melts away. The tube C, being always filled with the brine, which is of a low temperature, also contributes to the cooling effect; but if the brine were allowed to flow away as fast as it formed no such cooling effect would be produced by the tube C, or, at most, such effect would be very slight. If these tubes C are, however, found in any instance to be in the way of the convenient stowage of boxes or barrels they may be placed in the space between the floors without very materially affecting the action.

There is always more or less sediment from the brine in C, owing to the presence of foreign and insoluble matter in the ice and salt. This collects in the bottom of C and will not wash out with the small amount of waste brine, even if the pipe E be left open. The end of E is therefore liable to become choked. To avoid this, as also to get the advantage of the cooling effect due to the presence of the cool brine in contact with the surface of C, I employ the pipe F, attached to C at its highest point, and so bent as to keep C always full. The presence of sediment in C will not interfere with the proper escape of the surplus brine through F until C becomes full of sediment, before which time it should be cleaned out. This is done by opening the pipe E and, by means of rods introduced through E, so agitating the sediment in C as to cause it to flow out with the brine therein. During this process the ice in B may be supported by means of gratings temporarily placed therein for that purpose. As there are always two or more of these tubes C in every chamber, with their corresponding tubes, B, and pan D, this cleansing process may be performed on one at a time without seriously interfering with the operation of the chamber M, as the only effect thereon is a slight temporary reduction of the amount of cooling-surface.

The number and amount of surface of the tubes B and C and pans D depends much upon the circumstances under which the apparatus is to be used. Under ordinary circumstances I have found that the proportion of about one-sixth part of the exterior surface of the chamber is sufficient cooling-surface for preserving articles which have been previously frozen, or articles which it is not necessary to freeze entirely through. This proportion may be varied very much without affecting the character of my apparatus. The drawings, however, represent a form and proportion which I believe to be efficient and convenient in practice.

It may be well to remark, although no part of my invention, that the amount of salt used with a given quantity of ice depends on the intensity of the cold required. It should not under any circumstances greatly exceed the proportion of one pound to four pounds of ice, because if more is used than will dissolve at the temperature which attains in the apparatus in the water formed from the ice the surplus salt will itself fill the tube C and necessitate frequent cleaning thereof.

My invention, by retaining the cold brine in the tubes C and the lower end of the tubes B for a certain period, accomplishes an effect beyond what would be obtained by simply holding the fresh water in a similar manner in the base of an ordinary refrigerator, because the brine which descends from my freezing-mixture is not at the temperature of 32° Fahrenheit, like ordinary melted ice, but is far colder and capable of still producing a refrigeratory effect on the contents of the structure. My invention, by reason of the elevation of the tube F, holds back in the tubes C and B not simply water, which only stops the circulation of air, but also utilizes the cold in the brine, which is an effect never before obtained, as I am aware.

What I claim as my invention, and desire to secure by Letters Patent, is—

1. The employment in refrigeratory apparatus of the removable receiving and distributing pan D, in combination with the series of descending tubes B and suitable means of continuously draining the same, substantially as and for the purpose herein described.

2. The tapering form of the descending tubes B, arranged to operate in combination with a receiving and distributing pan, D, and a cooling-chamber, M, substantially as and for the purpose specified.

3. In refrigeratory apparatus, the arrangement of the open ascending drain-tube F relatively to the tubes C and B in the manner and for the purpose herein set forth.

In testimony whereof I have hereunto set my name in presence of two subscribing witnesses.

ENOCH PIPER.

Witnesses:
THOMAS D. STETSON,
G. H. BABCOCK.